(12) United States Patent
Chang et al.

(10) Patent No.: US 6,984,481 B2
(45) Date of Patent: Jan. 10, 2006

(54) WRITE-ONCE OPTICAL RECORDING MEDIUM

(75) Inventors: Hung-Lu Chang, Hsinchu (TW); Wen-Hsin Yen, Hsinchu (TW); Jung-Po Chen, Hsinchu (TW); Po-Fu Yen, Hsinchu (TW); Tzuan-Ren Jeng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 226 days.

(21) Appl. No.: 10/601,833

(22) Filed: Jun. 24, 2003

(65) Prior Publication Data
US 2004/0265741 A1    Dec. 30, 2004

(51) Int. Cl.
*G11B 7/24*    (2006.01)
(52) U.S. Cl. ............... 430/270.12; 430/945; 426/64.8; 369/288
(58) Field of Classification Search ............ 430/270.1, 430/270.11, 270.12, 270.13
See application file for complete search history.

(56) References Cited

U.S. PATENT DOCUMENTS

| 4,499,178 A | * | 2/1985 | Wada et al. ............ 430/270.12 |
| 4,763,139 A | * | 8/1988 | Itoh et al. ................. 346/135.1 |
| 4,961,979 A | * | 10/1990 | Iida et al. .................. 428/65.2 |
| 5,334,433 A | * | 8/1994 | Tominaga .................. 428/64.5 |

FOREIGN PATENT DOCUMENTS

| DE | 33 36 445 | * | 4/1984 |
| JP | 62-137739 | * | 6/1987 |
| JP | 62-144998 | * | 6/1987 |

OTHER PUBLICATIONS

Abstracts each of Ito et al and Kohler et al.*

* cited by examiner

*Primary Examiner*—Martin Angebranndt
(74) *Attorney, Agent, or Firm*—Bacon & Thomas, PLLC

(57) ABSTRACT

An optical recording medium includes a) a dielectric layer, b) a recording layer, and c) a reflective layer, which are stacked on a surface of a substrate in the described order or stacked on the surface in the order of b) the recording layer, a) the dielectric layer, and c) the reflective layer. The recording layer contains a mixed nickel oxides which decomposes to release a gas and becomes transparent upon heating.

14 Claims, No Drawings

WRITE-ONCE OPTICAL RECORDING MEDIUM

FIELD OF THE INVENTION

The present invention is related to a write-once optical recording medium, and in particular to a write-once optical recording medium having a recording layer of an inorganic compound.

BACKGROUND OF THE INVENTION

U.S. Pat. No. 5,252,370 and U.S. Pat. No. 5,334,433 disclose a write-once optical recording medium having a recording layer containing an inorganic compound, i.e. silver oxide or iron nitride. Upon exposure to recording laser light, an inorganic compound in the recording layer decomposes to release a gas, creating a space in the recording layer. A recess is created on the substrate surface or the reflective layer due to the pressure of evolving gas. The space and recess cause a change of optical conditions, resulting in a substantial lowering of reflectivity where the laser light is irradiated. This enables reproduction in accordance with the CD standard.

SUMMARY OF THE INVENTION

A primary objective of the present invention is to provide a write-once optical recording medium which is free from the drawbacks of the prior art.

Another objective of the present invention is to provide another option of making a write-once optical recording medium in addition to silver oxide and iron nitride used in U.S. Pat. No. 5,252,370 and U.S. Pat. No. 5,334,433.

A write-once optical recording medium made according to the present invention having a recording layer containing a mixed nickel oxides, NiOx, wherein said NiOx comprises NiO and $Ni_2O_3$ as a major portion.

In comparison with silver oxide and iron nitride, a NiOx recording layer is more stable in air. As a result, the write-once optical recording medium is more reliable for an extended period of time both before and after recording. Moreover, the NiOx recording layer will not only decompose to release a gas but become transparent from its original black color upon exposure to recording laser light, and these enable reproduction of signals in accordance with not only the CD standard but DVD and HD-DVD standards. The NiOx mixed oxides is non-toxic and has a relatively lower decomposition temperature.

DETAILED DESCRIPTION OF THE INVENTION

The present invention discloses a write-once optical recording medium comprising a substrate, a recording layer on a surface of said substrate, a dielectric layer on said recording layer, and a reflective layer on said dielectric layer, said recording layer comprising a mixed nickel oxides, NiOx, wherein said NiOx comprises NiO and $Ni_2O_3$ as a major portion. Upon exposure to recording laser light, said NiOx in the recording layer decomposes to release a gas and becomes transparent from its original black color, creating a space and mark in the recording layer. Since the substrate is also heated and softened, a recess is created in the substrate surface due to the pressure of evolving gas. The space, recess and color-change cause a change of optical conditions, resulting in a substantial change in reflectivity where the laser light is irradiated. This enables reproduction in accordance with the DVD and HD-DVD standards.

Alternatively, the present invention discloses a write-once optical recording medium comprising a dielectric layer on a surface of a substrate, a recording layer of NiOx on said dielectric layer, and a reflective layer on said recording layer. Upon exposure to recording laser light, said NiOx in the recording layer decomposes to release a gas and becomes transparent from its original black color, creating a space in the recording layer. The pressure of the evolving gas causes a recess to be created in the reflective layer. The space, recess and color-change cause a change of optical conditions, resulting in a substantial change in reflectivity where the laser light is irradiated. This enables reproduction in accordance with the DVD and HD-DVD standards.

The write-once optical recording mediums made according to the present invention are substantially the same in structure as those disclosed in U.S. Pat. No. 5,252,370 and U.S. Pat. No. 5,334,433, except that the former uses the mixed nickel oxides, NiOx, in the recording layer and the latter two US patents contain silver oxide or iron nitride in the recording layer. The disclosures in these two US patents are incorporated herein by reference. The mixed nickel oxides, NiOx, used in the present invention will decompose and release oxygen upon heating, which is at a temperature of about 150–370° C. depending on the composition thereof. Further, the resulting product NiO from the decomposition of the NiOx which is black is transparent.

Preferably, the recording layer has a thickness of 30 to 100 nm.

The recording layer of the present invention is preferably formed by gas phase growth techniques such as sputtering and evaporation techniques, especially by a reactive sputtering technique using oxygen gas as a reactive gas, and more preferably, an RF sputtering technique.

The recording layer of the mixed nickel oxides, NiOx, is formed by reactive sputtering in a low vacuum condition containing oxygen gas using NiO as a target. Preferably, oxygen gas is used in admixture with an inert gas such as Ar and the flow rate of oxygen gas is 10 to 100% of the total flow rate of all gases.

The pressure during reactive sputtering for depositing NiOx preferably ranges from $3 \times 10^{-1}$ to 60 Pa, and more preferably from 1 to 6 Pa.

Preferably, said dielectric layer is 10–300 nm in thickness, which may be made of silicon oxide or $Al_2O_3$.

Preferably, said reflective layer is 80–130 nm in thickness. Preferably, said reflective layer is made of a member selected from the group consisting of Ag, Al, Au, Pt, Cu and an alloy thereof Examples of the present invention are given below by way of illustration.

EXAMPLE 1

An optical recording disk was fabricated by forming on a surface of a substrate a dielectric layer of silicon oxide, a recording layer of mixed nickel oxides, a reflective layer and a protective film of UV curable resin.

The substrate used was a disk having a diameter of 120 mm and a thickness of 0.6 mm injection molded from polycarbonate resin with grooves configured at the same time.

The dielectric layer was formed to a thickness of 200 Å by sputtering using $SiO_2$ as a target.

The recording layer was formed to a thickness of 600 Å by reactive RF sputtering in an atmosphere containing oxygen gas and Ar gas. The sputtering pressure was 2.6 Pa and the ratio of flow rates of oxygen and Ar gases was 36/100. The target used was NiO and the sputtering power was 200 W. The composition of recording layer was analyzed by ESCA spectroscopy to find that it consisted of NiO and $Ni_2O_3$.

The reflective layer was formed to a thickness of 1,000 Å by sputtering using a Ag as a target.

For the optical recording disk made in this example, DVD signals (3T, 5T, 7T, 9T and 11T) were recorded and reproduced. Laser light of 12 mW was directed for recording and laser light of 0.5 mW directed for reproduction. The laser light had a wavelength of 405 nm.

The optical recording disk prepared in this example was subjected to a storage durability test of storing over 1,000 hours in normal condition. No substantial increase of error rate was found.

What is claimed is:

1. An optical recording medium comprising:
 a) a dielectric layer,
 b) a recording layer, and
 c) a reflective layer, which are stacked on a surface of a substrate in the described order;
 or stacked on said surface in the order of:
 b) the recording layer,
 a) the dielectric layer, and
 c) the reflective layer,
 said recording layer comprising mixed nickel oxides, wherein said mixed nickel oxide comprises NiO and $Ni_2O_3$ as a major portion.

2. The optical recording medium of claim 1, wherein said mixed nickel oxides decomposes to release a gas upon heating.

3. The optical recording medium of claim 2, wherein said heating is at a temperature of 150 to 370° C.

4. The optical recording medium of claim 1, wherein said mixed nickel oxides in said recording layer becomes transparent from its original black color upon heating.

5. The optical recording medium of claim 3, wherein said heating is at a temperature of 150 to 370° C.

6. The optical recording medium of claim 1, wherein said dielectric layer comprises silicon oxide or $Al_2O_3$.

7. The optical recording medium of claim 1, wherein said reflective layer is comprised of a member selected from the group consisting of Ag, Al, Au, Pt, Cu and an alloy thereof.

8. The optical recording medium of claim 1, wherein said recording layer is formed by a reactive sputtering technique.

9. The optical recording medium claim 8, wherein said recording layer is formed by reactive sputtering in an oxygen gas containing atmosphere using NiO as a target.

10. The optical recording medium of claim 1, wherein said recording layer is 30–100 nm in thickness.

11. The optical recording medium of claim 1, wherein said dielectric layer is 10–300 nm in thickness.

12. The optical recording medium of claim 1, wherein said reflective layer is 80–130 nm in thickness.

13. The optical recording medium of claim 1, wherein said mixed nickel oxide consist essentially of NiO and $Ni_2O_3$.

14. The optical recording medium of claim 1, wherein said mixed nickel oxides consists of NiO and $Ni_2O_3$.

* * * * *